Patented Jan. 19, 1932

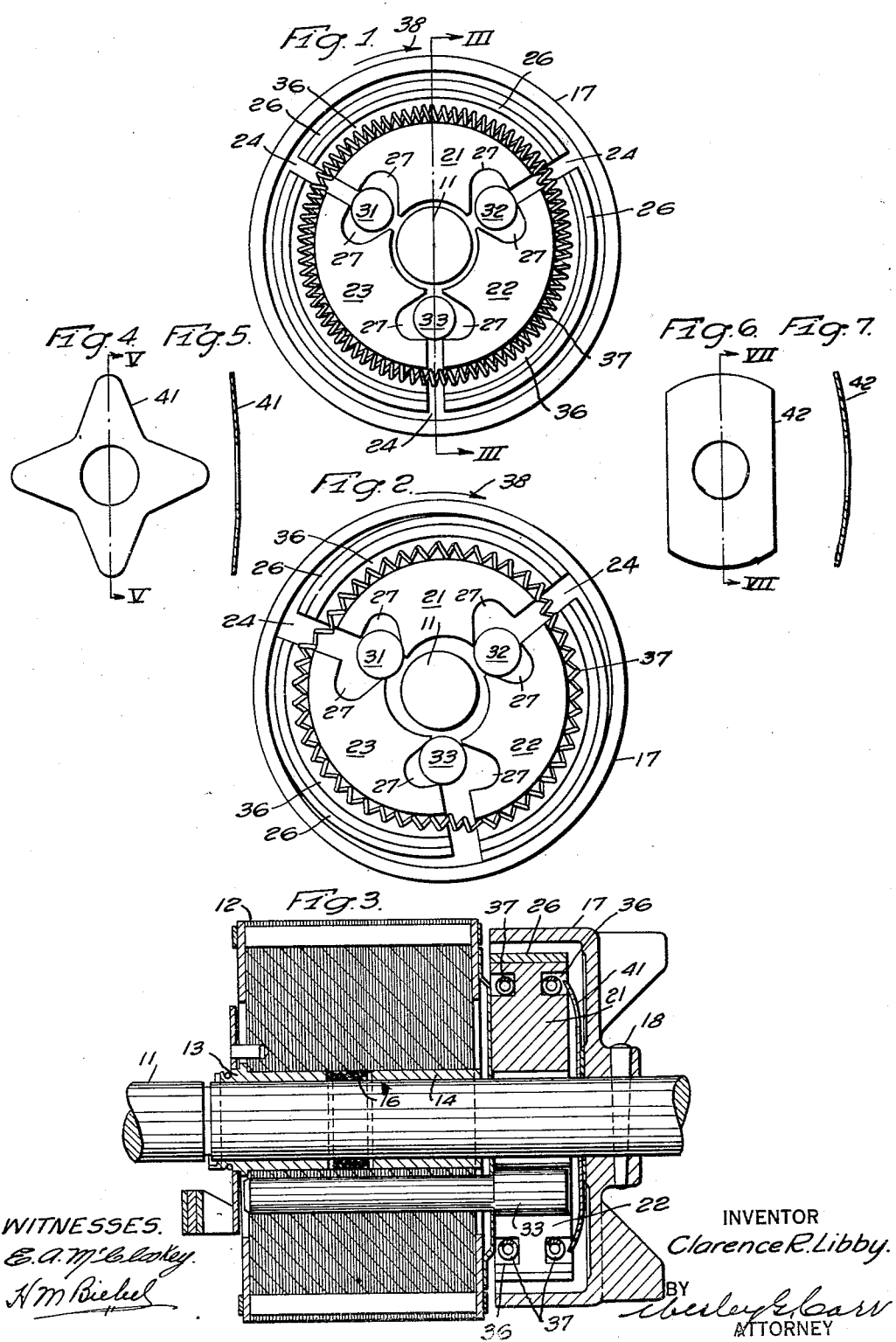

1,841,613

UNITED STATES PATENT OFFICE

CLARENCE R. LIBBY, OF SPRINGFIELD, MASSACHUSETTS, ASSIGNOR TO WESTINGHOUSE ELECTRIC & MANUFACTURING COMPANY, A CORPORATION OF PENNSYLVANIA

CLUTCH MECHANISM

Application filed April 2, 1931. Serial No. 527,192.

My invention relates to clutches and particularly to centrifugally-actuable clutches.

An object of my invention is to provide a relatively simple and effective device for preventing rattle of weights on their respective driving pins.

The device embodying my invention is to be operatively associated with a centrifugal-actuable clutch of the type disclosed and claimed in application, Serial No. 433,930, filed March 7, 1930, by H. D. Else and assigned to the Westinghouse Electric and Manufacturing Company. In a clutch of that kind, a plurality of substantially similar weights are located within a driven shell and so disposed as to engage the shell at a predetermined speed, each weight being driven by a pin at the trailing end of the weight. It was found, in early experiments with clutches of this type, that there was a tendency of a weight to rattle on its driving pin, under pulsating torque conditions, and the device more particularly disclosed and claimed in the present application was designed to prevent this rattle.

In practicing my invention, I provide a dished resilient plate at one side of the clutch weights to yieldingly engage the flat or side surfaces of the weights and thereby prevent rattle of the weights on the pins.

In the single sheet of drawings,

Figure 1 is a view, in end elevation, of a centrifugally-actuable clutch with which is associated the device particularly embodying my invention, the parts being shown in the inactive positions which they occupy at zero speed, Fig. 2 is a view similar to Fig. 1 but showing the elements in their active positions, Fig. 3 is a view, in axial section, through a rotor and a clutch associated therewith, the section through the clutch being taken on the line III—III of Fig. 1, Figs. 4 and 5 are views, respectively in front elevation and in section, of a resilient member embodying my invention, the view of Fig. 5 being taken on the line V—V of Fig. 4, and Figs. 6 and 7 are views, in front elevation and in section, of a modified form of resilient element embodying my invention, the view of Fig. 7 being taken on the line VII—VII of Fig. 6.

Referring to Fig. 3 of the drawings, I have there illustrated a shaft 11 having a rotor 12 loosely mounted thereon which is spaced from the shaft by two bushings 13 and 14 which fit tightly within the rotor structure 12 and loosely on the shaft 11. A wick 16, of substantially annular shape, may be initially filled with a lubricant in order to permit rotation of the bushings 13 and 14 on the shaft 11, when required. Any suitable or desired means for preventing axial movement of the rotor structure on the shaft 11 may be provided but, as this specific structure is not of my present invention, I have not shown the same in detail.

A driven shell 17 is rigidly secured on the shaft 11 by a taper pin 18 and, while I have shown a particular embodiment of a holding or securing means, I do not desire to be limited thereto.

With the shell 17 are located a plurality of similar weights 21, 22 and 23, each of general segmental shape and of such peripheral extent as to provide clearance spaces 24 between the adjacent radial edges or surfaces of adjacent weights. Each weight is provided with a facing 26 at its outer periphery, of a suitable wear-resisting material, in a manner well known in the art. Each weight is further provided with a recess 27 in each radial edge or surface and adjacent to each inner corner thereof, and driving pins 31, 32 and 33 have portions fitting tightly into the rotor structure 12 and other portions extending into the adjacent recesses 27, each of which is of approximately V-shape, as is shown in Figs. 1 and 2 of the drawings.

Each weight is provided with an arcuate recess 36 in each lateral surface, in which a garter spring 37 is located in order to yieldingly restrain the weights against the action of centrifugal force, the initial positions of the weights being shown in Fig. 1 of the drawings, these being the positions which they will occupy up to a predetermined speed, after which they will move radially outward until a portion of each weight, and particularly the leading outer peripheral portion, will tightly engage the inner face of shell 17 to drive the same.

The positions of the weights shown in Fig. 2 of the drawings is that for clockwise direction of rotation, as indicated by the arrow 38. It will be noticed that pin 32 is substantially out of recess 27 in the leading edge of weight 21, while pin 31 is in tightly or close wedging interfit in recess 27 in the trailing end of weight 21. It is also apparent that, in case of the opposite direction of rotation, pin 32 will fit tightly in recess 27 of weight 21, that is, the weight will be tilted in the reverse direction from that shown in Fig. 2.

It has been found that there is a tendency for any weight to rattle relative to or on its driving pin, particularly when a clutch of this type is used with a single-phase motor of the fractional-horse-power size, in which a pulsating torque will be present. This rattle will occur even though the tendency of the springs 37 is to hold the outer wall or edge of recess 27 at the radial face of the weight in close engagement with the radially outer surface of the pin fitting into the recess. The tendency of the springs 37 and of the reactive forces present during the normal-speed operation is to hold the trailing pin in the recess in the trailing end of a weight.

In order to ensure that the tight interfit of a pin in a weight shall be maintained during pulsating-torque conditions and at substantially normal speed, I provide a means located at one side of the weights, one form of this means being shown at 41 in Figs. 4 and 5. The element 41 may be made of resilient sheet material and may be of a four-point star shape, slightly dished, as is shown in Fig. 5 of the drawings. Or, I may use a narrow strip 42 of resilient sheet material, dished as shown in Fig. 7 of the drawings, openings being provided in the members 41 and 42 in order that they may be located on the shaft 11.

As shown particularly in Fig. 3 of the drawings, the outer peripheral ends of members 41 and 42 may project into a recess 36 and perform the double function of insuring retention of the spring 37 in the recess 36 and yieldingly restraining the weight and thereby preventing rattle of it on a pin. I have found that the addition of this relatively simple member in substantially the position shown in Fig. 3 of the drawings, where it directly frictionally engages the respective weights, will result in preventing any rattle of a weight on its driving pin.

Reference is here made to copending application Serial No. 522,291, filed March 13, 1931, by G. A. Leyner; application Serial No. 527,190, filed April 2, 1931, by H. D. Else and C. R. Libby, and application Serial No. 527,191, filed April 2, 1931, by H. D. Else, assigned to the Westinghouse Electric and Manufacturing Company.

As various modifications may be made in my invention without departing from the spirit and scope thereof, I desire that all such modifications shall be covered by the appended claims.

I claim as my invention:

1. In a clutch including a driven shell, a centrifugally-actuable weight in the shell disposed to engage it at a predetermined speed and having a recess of V-shape at its trailing edge, a pin in said recess for driving the weight, a resilient means engaging the weight to prevent engagement between the peripheral surface of the weight at the leading edge under speed below a predetermined value, and a resilient means at one side of the weight and pressing thereagainst for preventing rattle of the weight on the pin.

2. In a clutch including a driven shell, a centrifugally-actuable weight in the shell disposed to engage it at a predetermined speed and having a recess of V-shape at its trailing edge, a pin in said recess for driving the weight, a resilient means engaging the weight to prevent engagement between the peripheral surface of the weight at the leading edge under all speeds below a predetermined value, and a resilient means engaging the weight for maintaining a close wedging interfit of the pin in the recess in the weight under pulsating-torque conditions of the driving pin.

3. In a clutch including a driven shell, a centrifugally-actuable weight in the shell disposed to engage it at a predetermined speed and having a recess of V-shape at its trailing edge, a pin in said recess for driving the weight, a resilient means engaging the weight to prevent engagement between its peripheral surface at its leading edge under all speeds below a predetermined value, and a resilient means including a dished plate at one side of the weight and yieldingly pressing thereagainst for preventing rattle of the weight on the pin.

4. In a clutch including a driven shell, a centrifugally-actuable weight in the shell disposed to engage it at a predetermined speed and having a recess of V-shape at its trailing edge, a pin in said recess for driving the weight, a resilient means engaging the weight to prevent engagement between its peripheral surface at its leading edge under all speeds below a predetermined value, and a resilient means including a dished plate coaxial with the shell and located between the shell and the weight to yieldingly press against the latter to prevent rattle of the weight on the pin.

5. In a clutch including a driven shell, a plurality of centrifugally-actuable substantially similar weights in the shell disposed to engage it at a predetermined speed, each weight having a recess of substantially V- shape at each inner corner and a spring engaging all of the weights to prevent engagement thereof with the shell at all speeds below a predetermined value, pins in the pairs of recesses, each pin fitting into a recess of V-shape of a leading weight, and a resilient means yieldingly engaging the weights for ensuring a tight wedging fit of a pin in the recess of V-shape of the weight engaged thereby to prevent rattle therebetween under pulsating-torque conditions of the driving pin.

6. In a clutch including a driven shell, a plurality of centrifugally-actuable weights in the shell disposed to engage the shell at a predetermined speed, each weight having a peripheral recess in one side and having also a recess of substantially V-shape at each inner corner, a garter spring in the peripheral recess to prevent engagement of the shell by the weights at all speeds below a predetermined value, a plurality of pins in each pair of recesses of V-shape, each pin driving a weight leading it, and a dished resilient plate at one side of the weights for holding the garter spring in the peripheral recess in the weights and for ensuring a tight driving fit of a pin in a recess of V-shape under pulsating-torque conditions of the driving pins.

7. In a clutch including a driven shell, a centrifugally-actuable weight having two radial edges disposed in the shell to engage it at a predetermined speed and having a recess of substantially V-shape at each radial edge thereof, and a resilient member engaging the weight to prevent engagement thereof with the shell at all speeds below the predetermined speed, a pin extending into each recess, the pin trailing the weight driving the latter, and a resilient means operatively engaging the weight to ensure selective wedging and driving interfit of the pins in the recesses in accordance with the direction of rotation of the clutch under all conditions of operation thereof.

In testimony whereof, I have hereunto subscribed my name this twenty-fourth day of March, 1931.

CLARENCE R. LIBBY.